(12) United States Patent
Eichner

(10) Patent No.: US 6,607,768 B1
(45) Date of Patent: Aug. 19, 2003

(54) COFFEE ROASTING METHODS

(75) Inventor: Joachim Eichner, Madison, NJ (US)

(73) Assignee: Praxis Werke, Inc., East Hanover, NJ (US)

( * ) Notice: Subject to any disclaimer, the term of this patent is extended or adjusted under 35 U.S.C. 154(b) by 0 days.

(21) Appl. No.: 09/443,763

(22) Filed: Nov. 19, 1999

Related U.S. Application Data
(60) Provisional application No. 60/109,047, filed on Nov. 19, 1998.

(51) Int. Cl.[7] .................................................. A23F 5/04
(52) U.S. Cl. ........................... 426/466; 34/360; 34/576; 426/467
(58) Field of Search ................................. 426/466, 467, 426/443, 520; 99/286; 34/359, 360, 576

(56) References Cited

U.S. PATENT DOCUMENTS

| | | |
|---|---|---|
| 75,829 A | 3/1868 | Babbitt |
| 115,302 A | 5/1871 | Galloway |
| 177,592 A | 5/1876 | Underwood |
| 255,965 A | 4/1882 | Fleury et al. |
| 308,169 A | 11/1884 | Jennings |
| 1,237,931 A | 8/1917 | Malvezin |
| 1,602,576 A | 10/1926 | Gant |
| 1,788,705 A | 1/1931 | Close |
| 2,087,602 A | 7/1937 | McCrosson |
| 2,212,120 A | 8/1940 | Kneale |
| 2,213,120 A | 8/1940 | Burgess |
| 2,278,217 A | 3/1942 | Rodanet |
| 2,278,473 A | 4/1942 | Musher |
| 2,282,708 A | 5/1942 | Dantzig |
| 2,444,217 A | 6/1948 | Armentrout |
| 2,497,501 A | 2/1950 | Himmel |
| 2,581,148 A | 1/1952 | Scull et al. |
| 2,712,501 A | 7/1955 | Hale |
| 2,857,683 A | 10/1958 | Schytil |
| 2,859,116 A | 11/1958 | Heimbs et al. |
| 2,874,483 A | 2/1959 | Brandl |
| 3,088,825 A | 5/1963 | Topalian et al. |
| 3,088,875 A | 5/1963 | Fisk et al. |
| 3,106,470 A | 10/1963 | Spotholz |
| 3,106,670 A | 10/1963 | Laux |
| 3,122,439 A | 2/1964 | MacAllister |
| 3,149,976 A | 9/1964 | Smith, Jr. |
| 3,189,460 A | 6/1965 | Smith, Jr. |
| 3,223,021 A | 12/1965 | Osswald |
| 3,285,157 A | 11/1966 | Smith, Jr. |

(List continued on next page.)

FOREIGN PATENT DOCUMENTS

| | | | |
|---|---|---|---|
| CA | 989246 | 5/1976 | .................... 99/76 |
| WO | WO 84/01270 | 4/1984 | |

OTHER PUBLICATIONS

Comparison of Changes in Roasted Coffee Beans in Pressurized Oxygen Free vs. Atmospheric Roasters, M. Sivetz, Canada Institute for Scientific and Technical Information, 1973, pp. 199–221.

Primary Examiner—George C. Yeung
(74) Attorney, Agent, or Firm—Muserlian, Lucas & Mercanti, LLP

(57) ABSTRACT

Coffee beans and the like are roasted in an enclosed, pressurized roaster under conditions which provide rapid heat transfer and close control of roasting time-temperature profiles. The roasting chamber desirably has a bottom screen, a top screen and a shutter adapted to momentarily occlude flow through the various portions of the top screen. Roasting gas passes upwardly through the beans, entrains some of the beans and forces them against the top screen. The beans drop back into the chamber when the shutter occludes a particular portion of the top screen holding the beans. Time-temperature profiles can be controlled by monitoring process conditions such as inlet and outlet gas enthalpies.

45 Claims, 5 Drawing Sheets

U.S. PATENT DOCUMENTS

| | | | |
|---|---|---|---|
| 3,328,172 A | 6/1967 | Smith, Jr. | |
| 3,329,506 A | 7/1967 | Smith, Jr. | |
| 3,345,180 A | 10/1967 | Smith, Jr. | 99/68 |
| 3,345,181 A | 10/1967 | Smith, Jr. | |
| 3,370,502 A | 2/1968 | Wilks | |
| 3,395,634 A | 8/1968 | Smith, Jr. | 99/236 |
| 3,572,235 A | 3/1971 | Nutting | |
| 3,589,911 A | 6/1971 | Friedman | 99/68 |
| 3,589,912 A | 6/1971 | Adler | 99/68 |
| 3,595,668 A | 7/1971 | Nutting | |
| 3,615,668 A | 10/1971 | Smith, Jr. | 99/68 |
| 3,640,726 A | 2/1972 | Bolt | 99/68 |
| 3,724,090 A | 4/1973 | Smith, Jr. | 34/57 |
| 3,730,731 A | 5/1973 | Smith, Jr. | 99/68 |
| 3,762,930 A | 10/1973 | Mahlmann | 99/68 |
| 3,763,766 A | 10/1973 | Smith, Jr. | 99/468 |
| 3,767,417 A | 10/1973 | Touba | 426/523 |
| 3,767,418 A | 10/1973 | Ponzoni | 426/461 |
| 3,821,450 A | 6/1974 | Stauber | 426/467 |
| 3,823,662 A | 7/1974 | Smith, Jr. | 99/468 |
| 3,874,766 A | 4/1975 | Mizusawa | 339/125 |
| 3,964,175 A | 6/1976 | Sivetz | 34/57 |
| 4,096,792 A | 6/1978 | Smith, Jr. | 99/355 |
| 4,169,164 A | 9/1979 | Hubbard | 426/467 |
| 4,215,151 A | 7/1980 | Rios | 426/467 |
| 4,246,836 A | 1/1981 | Smith, Jr. | 99/478 |
| 4,322,447 A | 3/1982 | Hubbard | 426/467 |
| 4,349,573 A | 9/1982 | Stefanucci | 426/388 |
| 4,484,064 A | 11/1984 | Murray | 219/400 |
| 4,494,314 A | 1/1985 | Gell, Jr. | 34/10 |
| 4,501,761 A | 2/1985 | Mahlmann et al. | 426/467 |
| 4,540,591 A | 9/1985 | Dar et al. | 426/388 |
| 4,737,376 A | 4/1988 | Brandlein et al. | 426/467 |
| 4,988,590 A | 1/1991 | Price et al. | 426/595 |
| 5,382,638 A * | 1/1995 | Bontemps et al. | 422/144 |
| 5,500,237 A | 3/1996 | Gell, Jr. et al. | 426/466 |
| 5,573,802 A | 11/1996 | Porto | 426/466 |
| 5,681,607 A | 10/1997 | Maki et al. | 426/595 |
| 5,958,494 A * | 9/1999 | Tidland et al. | 426/466 |

* cited by examiner

COFFEE ROASTING METHODS

CROSS-REFERENCE TO RELATED APPLICATIONS

The present application claims benefit of U.S. Provisional Application 60/109,047 filed Nov. 19, 1998, the disclosure of which is incorporated by reference herein.

FIELD OF THE INVENTION

The present invention relates to methods and apparatus for roasting coffee and similar particulate vegetable materials.

BACKGROUND OF THE INVENTION.

Coffee beans are roasted to develop the characteristic flavor and aroma of the product as used by consumers. The flavor and aroma of green coffee are not desirable; but when green coffee beans are roasted, complex, thermally-induced chemical reactions convert compounds contained in the beans, such as sugars, amino acids, polysaccharides, proteins, trigonelline, chlorogenic acids, and others into more than 800 compounds that collectively provide the desirable, extractible flavor, color and aroma characteristic of roasted coffee. Some green coffee components that do not react during roasting, such as caffeine, contribute to roasted coffee's stimulatory action and flavor, but most of roasted coffee's flavor, color and aroma is provided by compounds generated in roasting-induced reactions.

Coffee roasting involves systems of interdependent chemical reactions that proceed along series and parallel reaction paths. Rates of these reactions increase markedly, but to different extents, as bean temperature increases. Because of reaction interdependence and the varying effects of temperature on individual reaction rates, the makeup and yield of products generated by roasting depend on bean temperature versus time history during roasting. Consequently, the flavor and aroma of roasted coffee depend on that history. Control of the temperature-versus-time history of the coffee during the roasting process would greatly enhance control of flavor and aroma.

Roasting initially is endothermic; i.e. heat transferred to coffee beans raises their sensible heat content, evaporates water and provides heat used in endothermic reactions. After bean temperatures reach 160° C., rapid exothermic reactions occur, bean temperatures rapidly rise and coffee's flavor changes very rapidly. Excessive weight loss and undesirable flavor changes occur if roasting is excessively prolonged. Therefore, to end roasting quickly and provide coffee of desired, reliably duplicated quality, beans most commonly are rapidly cooled (quenched) as soon as they reach a selected end-of-roast temperature. First, a controlled amount of water, is sprayed on the beans and largely evaporates, providing evaporative cooling. Then, the beans are cooled further by forced contact with ambient-temperature air.

Reflectance color is the fraction of incident light of selected spectral composition that is diffusely reflected from the surface of a suitable sample of compressed, ground, roasted coffee. The lower the reflectance color, the darker the coffee. End-of-roast temperatures correlate well with roast darkness, as measured by reflectance color. Roast darkness, in turn, roughly correlates with flavor. Some consumers prefer relatively dark and bitter roasted coffees; others prefer relatively light, somewhat acid coffees; and still others prefer coffee of intermediate character.

Roasting conditions also influence the bulk density (mass of coffee per unit volume) of the roasted coffee beans. As further explained below, under certain roasting conditions the coffee beans can be "puffed" by internal pressure of steam and other gasses when the walls of the beans soften at elevated temperature. Such puffing reduces the bulk density. The bulk density of the roasted beans in turn influences the bulk density of the ground product as sold to the consumer and the weight of coffee which fits into a standard coffee can or other container.

Coffee roasting thus requires careful control of numerous factors which influence the taste and appearance of the product. Because the coffee roasting business is competitive, economic factors such as capital costs, energy costs and coffee loss during the process are of great significance. Waste products discharged from coffee roasting processes can be a source of pollution. It is important to minimize such pollution while still maintaining an economical process and without comporomising the quality of the finished product.

All of the aforementioned factors together make coffee roasting a complex and difficult process. A vast number of methods and apparatus for roasting coffee have been proposed. Most commercial coffee roasting processes currently in use are performed at atmospheric pressure by contacting the coffee with hot gases such as a hot inert gas, typically nitrogen. The incoming gas heats the coffee beans whereas the outlet gas carries off waste products such as chaff and gases evolved in roasting. Traditional roasting methods can achieve only limited rates of heat transfer to the beans, and cannot provide full control of the bean time and temperature history. Further, traditional roasting methods and apparatus require significant effort and expense to minimize pollution.

Various proposals have been advanced for high-pressure roasting systems. Notably, numerous patents issued to Horace L. Smith Jr. describe batch or continuous systems for pressure-roasting of coffee in rolling fluidized beds or spouted beds. A "fluidized bed" system directs a gas or other fluid upwardly through a mass of particulates such as coffee beans, so that the particulates are held suspended in the rising fluid. Ideally, the upward flow is nearly uniform in all regions of the bed. A "spouted bed" system utilizes upward flow of the gas or other fluid concentrated at a few locations within the bed. The particles move upwardly at these locations and downwardly at other locations in the bed. Most of the Smith patents call for use of pressurized, low-oxygen-content gas circulating in a closed loop through: a heater, a bed of roasting coffee in a heavy-walled, cylindrical chamber and a cyclonic separator. The cyclonic separator removes small particles, commonly referred to as "chaff" from the gas. Some of the Smith patents use gas pressures up to 300 psig (2.1 MPa gauge). In a specific example, Robustas were roasted at 150 psig to improve their flavor. The roasting gas was heated by indirect contact with either a high-temperature, heatexchange fluid or hot gases produced in a fuel-fired furnace. To remove undesirable aromas, improve coffee flavor or puff roasting coffee, part of the roasting gas was bled off in some cases and replaced by inert gas produced by combustion of fuel. Certain Smith patents suggest that undesirable aromas also could be removed by condensation or scrubbing. Processes and methods disclosed in these patents suffer from certain fundamental limitations relating to the physical characteristics of the beds. If the gas velocity through the bed is increased, the fluidization becomes excessive. Beans can be entrained with the gas and carried out of the roaster into the remainder of the system. Moreover, the proper operation of the beds depends strongly on the depth of beans in the bed. Circulation of beans within the bed is suppressed if the bed is too shallow, whereas slugging and erratic spouting occur if the bed is too deep.

Moreover, the Smith patents do not provide particularly precise control or repeatability in the process, inasmuch as these patents rely principally on control of gas inlet temperature to the roaster together with end-of-roast temperature or color measurements to indicate when the roasting procedure is complete.

Thus, despite these and other efforts in the art, there has been a significant need in the art for improvements in coffee roasting methods and apparatus.

SUMMARY OF THE INVENTION

The present invention addresses these needs.

One aspect of the invention provides methods of roasting coffee. The preferred methods according to this aspect of the invention include the steps of placing a charge of beans into a roasting chamber having a top and bottom, and directing a hot inlet gas through the beans from adjacent the bottom of said chamber and out of said chamber adjacent said top of said chamber to thereby form a fluidized or suspended bed of beans in said chamber and supply heat to the beans, whereby an exhaust gas including at least some of the inlet gas together with roasting byproducts will be discharged from said chamber. Methods according to this aspect of the invention most preferably include the step of trapping beans which are carried upward in the chamber by the flowing gas using a screen disposed adjacent said top of said chamber. The methods also most preferably include the step of moving a shutter in proximity to the screen so as to momentarily block gas flow through different sectors of the screen. Thus, beans held in engagement with the screen by the flowing gas will be released from the screen in each sector when gas flow through such sector is blocked.

The preferred methods according to this aspect of the invention can employ extraordinarily high gas flow rates through the chamber while still maintaining well-controlled patterns of bean circulation within the chamber, without losing beans in the exhaust gas and without packing the beans into a solid slug against the screen. For example, the mean velocity of the gas flowing in the chamber can be on the order of 0.5 meters/sec or more, and most typically about 0.5–2.5 meters/sec. Gas velocities of about 0.5–1.7 meters/sec are more preferred at relatively low inlet air temperatures of about 260° F., whereas velocities up to about 2.5 meters/sec are more preferred at higher inlet air temperatures. Most preferably, the gas within the roasting chamber is maintained under a superatmospheric pressure, typically about 50-about 300 psig, i.e., about 0.35 to about 2.1 MPa gauge. The preferred methods according to this aspect of the invention can provide extraordinarily high rates of heat transfer to the beans, while maintaining excellent uniformity throughout the charge of beans and precise control of process conditions. The high rates of heat transfer available in the most preferred processes according to this aspect of the invention lead to several significant advantages, including high throughput in apparatus of reasonable size, as well as the ability to achieve temperature-versus-time profiles which are different from the temperature-versus-time profiles normally employed. Moreover, these conditions can be achieved with reasonable consumption of energy for pumping gas through the chamber.

The hot inlet gas, and hence the exhaust gas, typically consists predominantly of non-reactive gas components which are substantially non-reactive with said beans, such as nitrogen and carbon dioxide. Most preferably, at least some of the exhaust gas is reheated by passing said gas through a heater that generates heat and transfers it to said exhaust gas through an impermeable wall, and then passed back into the roasting chamber as inlet gas. Desirably, a charge of gas circulates through a substantially closed gas circulation system including said chamber so that said charge of gas is substantially retained within said circulation system during the process. The process desirably is performed using multiple charges of coffee beans, and hence includes the steps discharging the charge of beans from the chamber and reloading the chamber with a new charge of beans while substantially retaining the charge of gas within said circulation system. These steps are repeated cyclically so as to roast a series of charges of beans while substantially retaining the charge of gas within said circulation system.

In particularly preferred methods according to this aspect of the invention, the circulation system includes a cooler, and the method further includes the step of cooling each charge of beans within the roasting chamber prior to discharging that charge of beans from the chamber by circulating a portion of the charge of gas through a first portion of the circulation system including the cooler and the chamber. Preferably, this step is performed without circulating the first portion of the charge of gas through the heater. The same extraordinarily rapid rates of heat transfer which prevail during the roasting steps can be achieved during cooling, and hence the beans can be quenched effectively by the circulating cooled gas. A second portion of the charge of gas may continue to circulate through the remainder of the circulation system, including the heater, during this phase of the process.

The methods according to this aspect of the invention may further include the step of venting a selected portion of the charge of gas. Desirably, the venting procedure is performed so as to vent little or no gas during roasting of one or more early charges until the gas within said circulation system attains a desired level of volatile bean products and then vent more gas during roasting of one or more later charges so as to maintain the level of volatile bean products within the gas substantially constant.

A further aspect of the invention provides methods of roasting coffee beans which include the steps of supplying heat to the beans while the beans are disposed in an enclosed roasting chamber while directing a gas through the chamber so that an exhaust gas containing roasting byproducts including solid chaff and water vapor evolved from the beans is discharged from said chamber, venting at least a portion of the exhaust gas through a recovery device so as to remove chaff from the vented exhaust gas and condensing water vapor from the vented exhaust gas so that the condensed water wets at least some of the removed chaff. In one preferred method according to this aspect of the invention, the step of venting the exhaust gas includes the step of directing the vented exhaust gas through a cyclone having cooled walls so that said cyclone removes chaff from the exhaust gases and condenses water vapor from the exhaust gas. Removal of water along with at least some of the chaff simplifies the task of controlling the chaff ejected from the system to avoid pollution.

Yet another aspect of the invention provides methods of roasting coffee beans including the step of supplying heat to the beans while the beans are disposed in an enclosed roasting chamber by burning a fuel in a burner outside of said chamber so that the products of combustion generated in said burner are isolated from said beans, venting an exhaust gas from said chamber including roasting byproducts, and recycling at least a portion of the vented exhaust gas into the burner to thereby provide a mixture of fuel, air and exhaust gas. For example, at least some of the vented exhaust gas may be incorporated into the fuel stream prior to admixture with the air stream. Preferred methods according to this aspect of the invention include the step of monitoring the composition of combustion products produced by the burner and controlling the composition of the mixture responsive to said monitoring. Typically, the exhaust gas includes roasting byproducts in a substantially non-reactive gas such as nitrogen or carbon dioxide. The recycling and controlling steps desirably are performed so as to maintain the mixture at about 8% oxygen content. This provides for stable combustion but minimizes production of nitrogen oxides in the burner.

A still further aspect of the invention provides methods of roasting coffee beans with enhanced control. The preferred methods according to this aspect of the invention include the steps of providing coffee beans in a roasting chamber and directing a heated gas into said chamber and through said chamber so that the heated gas contacts the beans; preselecting a desired roasting bean temperature versus time profile; monitoring either or both of (1) the temperature of the beans; and (2) a set of parameters sufficient to determine the enthalpies and mass flow rates of the inlet gas and exhaust gas; and adjusting the condition of the inlet gas directed into the chamber responsive to the results of said monitoring step during the process to minimize deviations between the determined and desired bean temperature versus time profiles. The monitoring step may include the step of monitoring the outlet temperature of gas leaving the chamber. As the outlet temperature will vary closely with the temperature of the beans, the temperature of the beans can be monitored effectively in this manner. Most desirably, the monitoring step includes the step of monitoring the inlet and outlet pressures and temperatures and determining the amount of heat delivered to the beans as a function of time from these pressures and temperatures. As the actual heat transfer to the beans can be monitored during the process, the temperature versus time conditions can be controlled and matched to a predetermined profile. The method may further include the step of detecting when the amount of heat delivered to the beans equals the desired amount of heat necessary for roasting and halting roasting when such condition occurs. Desirably, the step of directing gas through the chamber includes the step of circulating at least a portion of the gas in a substantially closed circulation system from the chamber through a condenser and a heater, and the step of adjusting the inlet gas conditions includes the step of adjusting heat removal from the gas at said condenser.

The preferred methods according to the present invention include combinations of the foregoing aspects, and particularly preferred methods include all of these aspects of the invention. As will be further explained below, the various aspects of the invention interact with one another. Merely by way of example, control of bean temperature and time profiles is especially effective using the preferred roasting methods with high heat transfer rates as discussed above.

Still another aspect of the present invention provides a roaster for roasting coffee beans and other particulate vegetable materials. A roaster according to this aspect of the invention includes a structure defining an enclosed roasting chamber having a top and a bottom, and one or more bean transfer openings to permit the introduction of beans into the roasting chamber and withdrawal of beans from the roasting chamber. The roaster further includes a gas inlet communicating with the roasting chamber adjacent the bottom of the chamber to direct gas through the beans, as well as a top screen disposed adjacent the top of said roasting chamber, the top screen including a plurality of openings no larger than the size of the beans. A gas outlet communicates with the roasting chamber above the top screen so that gas directed through the beans will pass through the top screen before passing through the gas outlet.

Most preferably, the roaster further includes a shutter mounted for movement over a range of positions in proximity to said top screen to cut off the flow of gas through a shifting sector of the top screen as the shutter moves across the screen, whereby beans engaged on the top screen at such sector will fall back into the chamber, away from the top screen. Preferably, the shutter is mounted above the top screen. Roasters according to this aspect of the invention can provide advantages similar to those discussed above in connection with the methods, including high rates of heat transfer to and from the beans.

The top screen may be in the form of a surface of revolution about a central axis, and the roaster may further include a shaft mounted in the chamber for rotation about the central axis, the shutter being mounted to the shaft so that the shutter can be moved across said top screen be rotating the shaft. An agitator may be mounted to the shaft beneath the top screen for agitating beans in the chamber.

The roaster may further include a bottom screen having a plurality of openings disposed adjacent the bottom of said chamber, so that the top and bottom screens bound a central region of the chamber for holding beans to be roasted. In this case, the gas inlet desirably communicates with the chamber beneath the bottom screen. The bottom screen may have a bean outlet aperture coaxial with the shaft, the shaft having a hub mounted thereon below the shutter, the shaft being axially movable between an operating position in which the hub occludes the bean outlet aperture and a discharge position in which the hub does not occlude the bean outlet aperture.

The bottom screen desirably has a sloping surface extending from a highest portion to a lowest portion and the bean outlet aperture desirably extends through the bottom screen at the lowest portion. For example, the bottom screen may be generally conical and may have its lowest portions adjacent the tip of the cone, the bean outlet aperture being disposed at the tip of the cone. Desirably, the open area of the screen per unit of horizontal projected area of the bottom screen is greater in lowest portion of the screen than in the highest portion of the screen. This provides less resistance to gas flow in those regions of the screen aligned with the thicker portions of the bean mass in the chamber, and helps to equalize the flow throughout the chamber.

Yet another aspect of the present invention provides a pressure roasting system having a substantially closed circulation system including a roasting chamber for retaining a charge of beans to be roasted, a heater and at least one circulation blower connected to one another for circulating a gas under pressure in the circulation system through the roaster and heater. The system according to this aspect of the invention desirably also includes a pressure storage tank for holding gas at a pressure slightly above the maximum pressure used in the circulation system, a pressure release tank and a compressor connected between the pressure release tank and the pressure storage tank for transferring gas from the pressure release tank to the pressure storage tank to thereby maintain the pressure release tank at a pressure substantially lower than the pressure used in the circulation system. One or more selectively-operable pressure release valves may be provided for venting gas from the circulation system to the pressure release tank, along with one or more selectively-operable gas charging valves for transferring gas from the pressure storage tank to the circulation system. As further discussed below, this arrangement provides for rapid pressure release from the circulation system, which can be used, for example to control and promote puffing of the coffee beans, without substantial loss of inert gas and aroma constituents and without the atmospheric pollution problems associated with rapid venting of large amounts of gas from a roasting system.

A roasting system according to a further aspect of the invention has a substantially closed circulation system including a roasting chamber for retaining a charge of beans to be roasted, a heater and at least one circulation blower connected to one another for circulating a gas in the circulation system through the roaster and heater. The system further includes a chaff separator, the chaff separator including wall structure defining a separation chamber connected in the circulation system so that gas passing though the circulation system will pass through the separation chamber, and means for physically separating chaff from gas passing in the separation chamber. The system further includes means for cooling gas as it passes through the chaff separation chamber to thereby condense water vapor from the gas in the separation chamber a waste outlet communicating with the separation chamber for discharging water and chaff. The chaff separator may be is a cyclonic separator, and the means for physically separating may include means for directing gas passing through the separation chamber to flow in a cyclonic pattern. Desirably, the means for cooling gas includes means for cooling the wall structure of the separation chamber. The system according to this aspect of the invention may further include a scraper mounted in the separation chamber for mechanically dislodging chaff from the wall structure of the separation chamber, and may also include a discharge auger mounted in the separation chamber for forcing chaff and waste out of the separation chamber through the waste outlet.

These and other objects, features and advantages of the invention will be more readily apparent from the detailed description of the preferred embodiments set forth below, taken in conjunction with the accompanying drawings.

BRIEF DESCRIPTION OF THE DRAWINGS

FIG. 1C is a diagram illustrating the fit of FIGS. 1A and 1B.

DETAILED DESCRIPTION OF THE PREFERRED EMBODIMENTS

Figure 3:
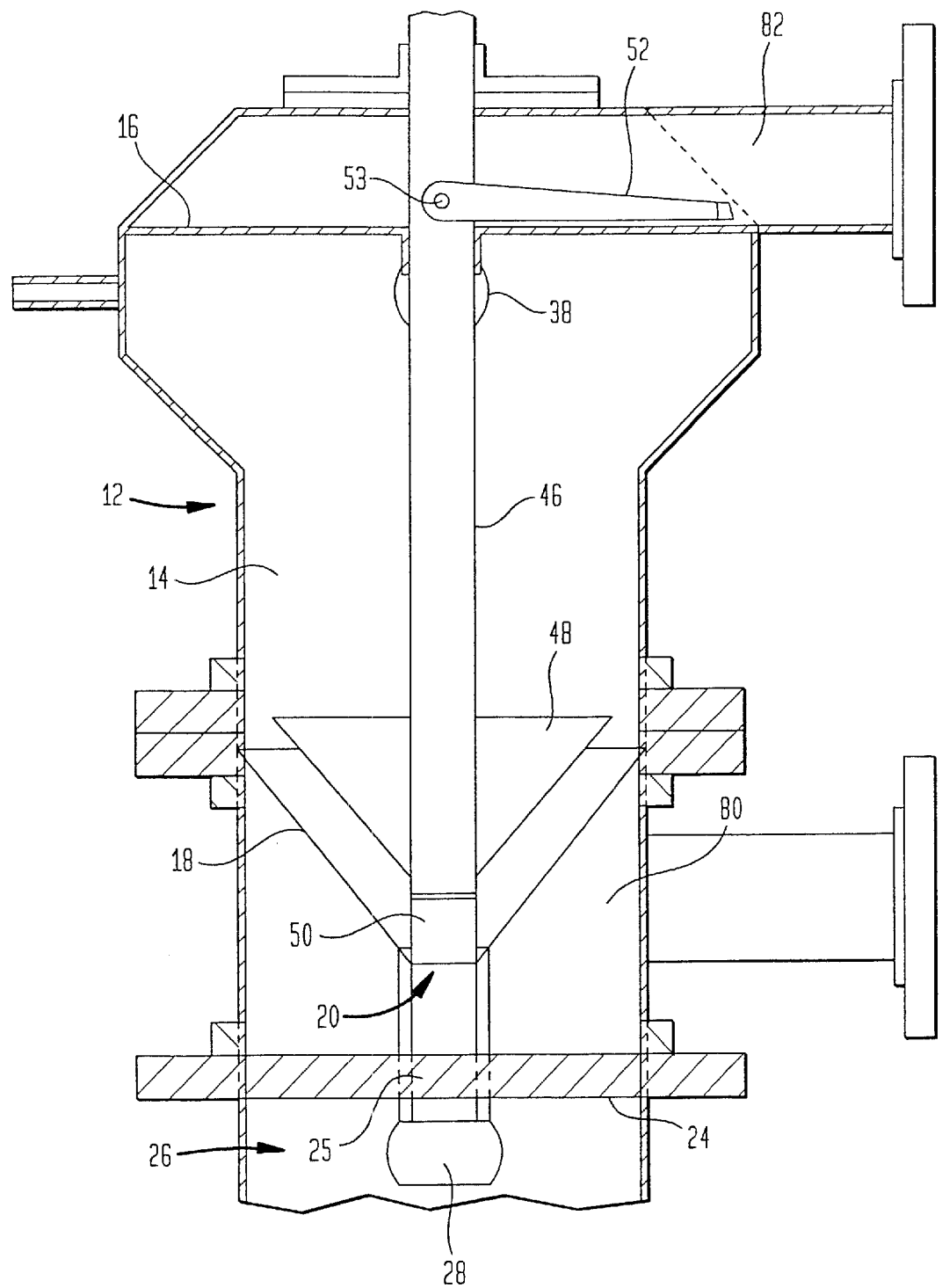
FIG. 3 is a diagrammatic sectional view taken along line 3—3 in FIG. 2.

Apparatus in accordance one embodiment of the invention incorporates a roasting process unit 10 having wall structure 12 defining a hollow cylindrical roasting chamber 14. As best seen in FIG. 3, a top screen 16 extends across the roasting chamber. Screen 16 has openings slightly less than 4 mm in diameter. A generally conical bottom screen 18 is disposed near the bottom of the roasting chamber. The conical bottom screen has openings similar to those of the top screen. As best seen in FIG. 3, the conical bottom screen is generally coaxial with the cylindrical roasting chamber. It may also have a slightly larger number of openings per unit of projected area adjacent the center of the screen than adjacently peripherally of the screen. The screen has a bean outlet aperture 20 in its center at its lowest point, i.e., on the axis of the chamber. The wall structure of the chamber includes a solid bottom wall 24. Bottom wall 24 has a hole 25 aligned with bean outlet aperture 20.

Figure 1A:
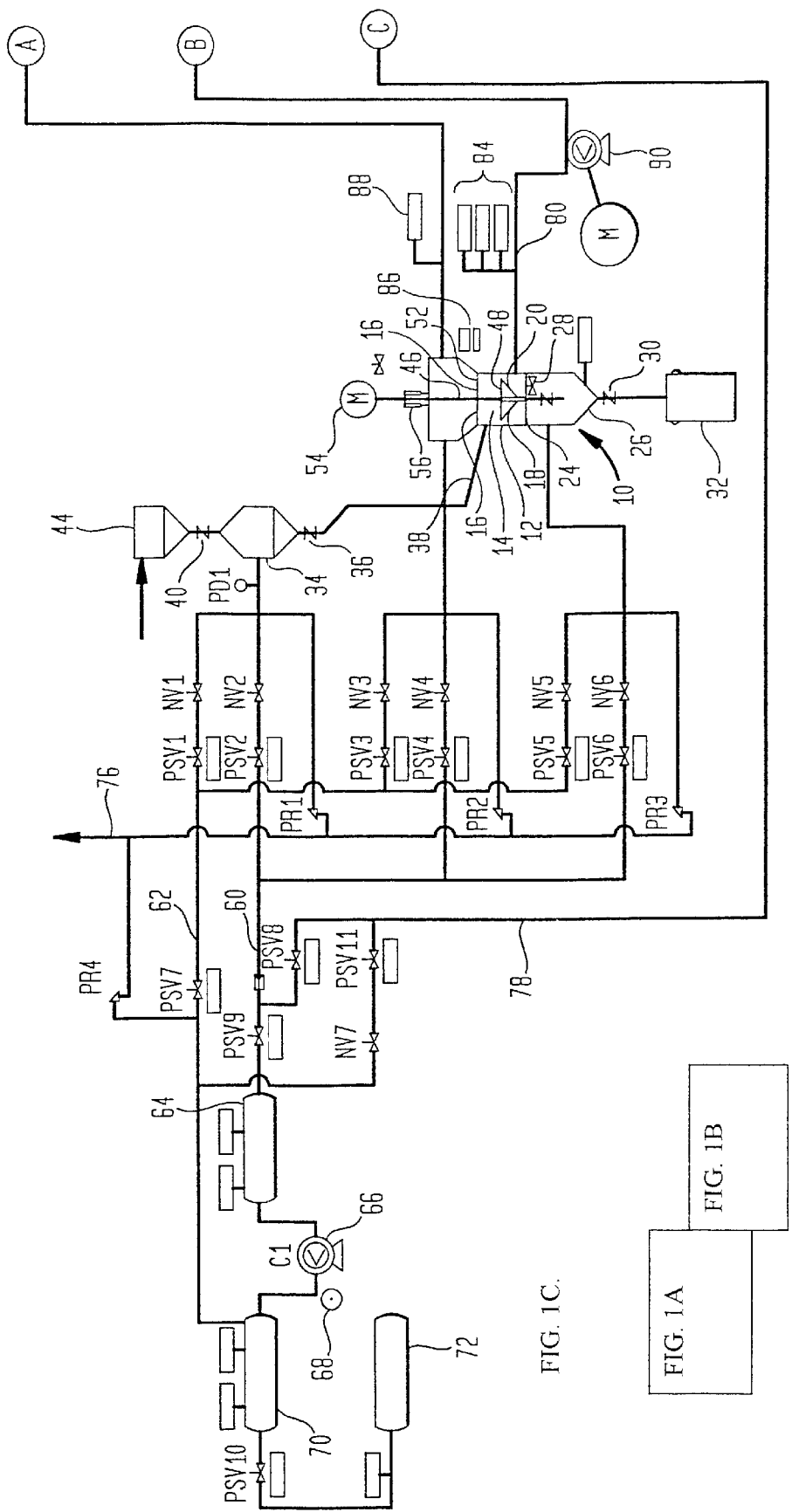
FIGS. 1A and 1B are two halves of a single schematic piping diagram of apparatus in accordance with one embodiment of the invention.
Figure 1B:
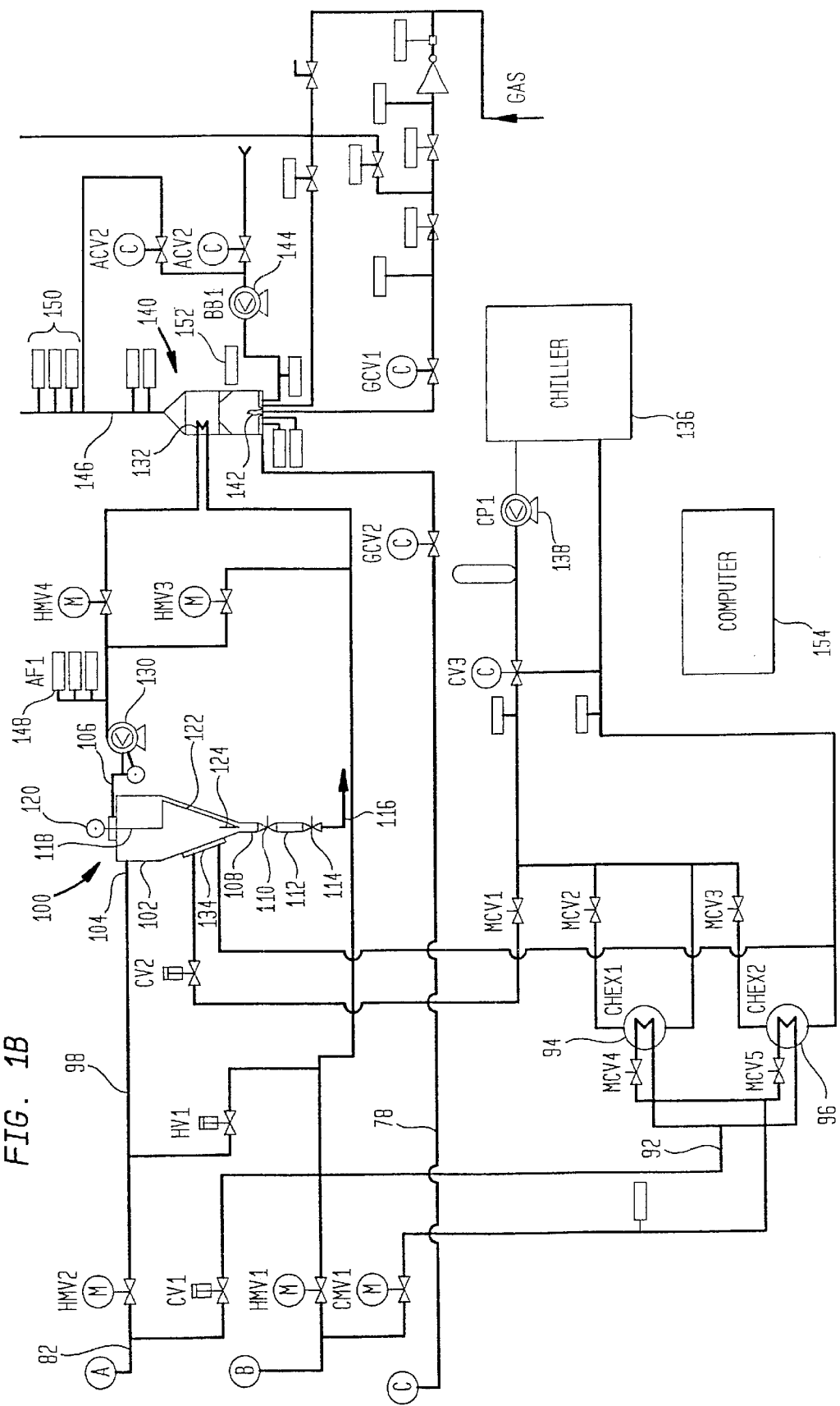
Figure 2:
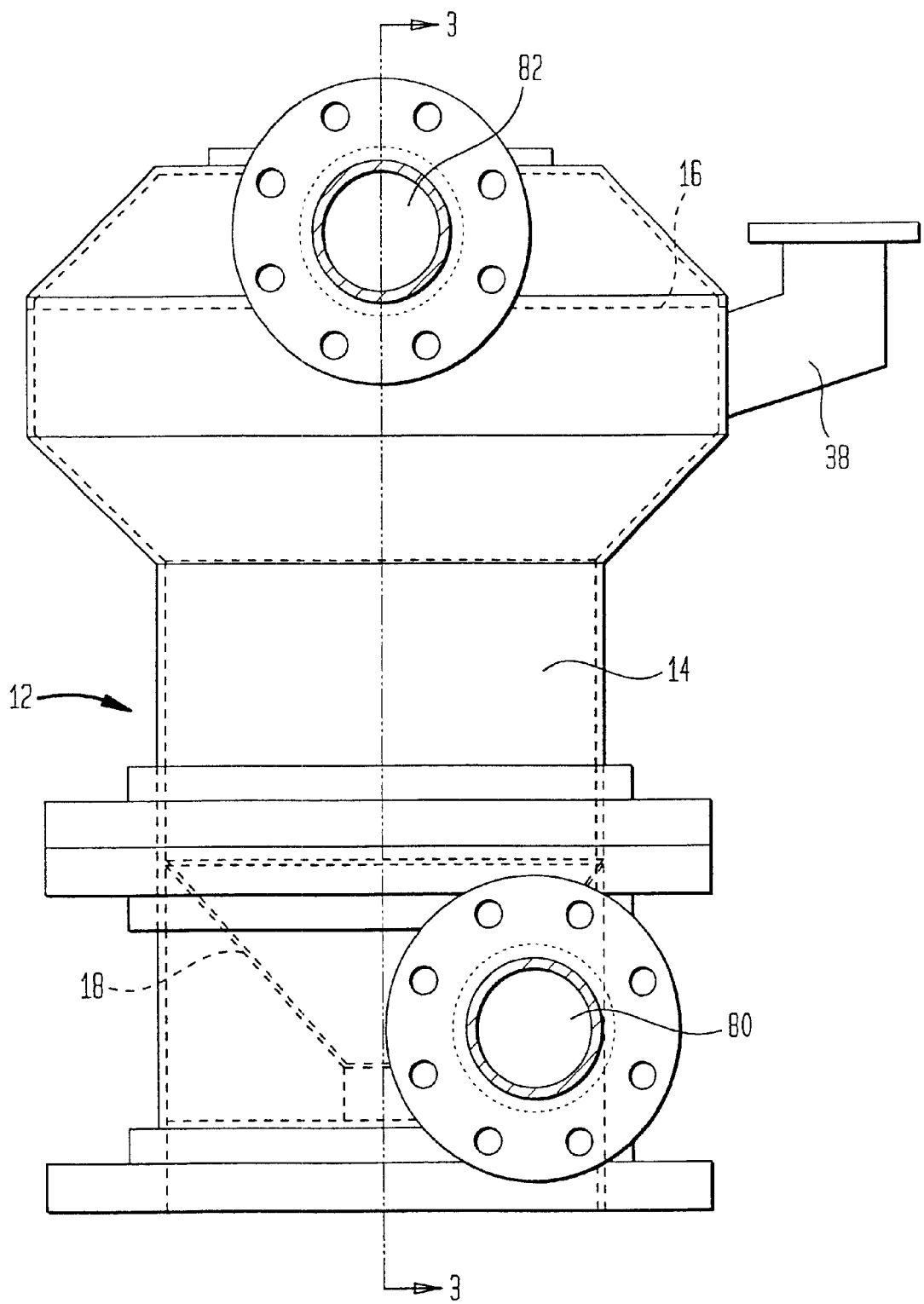
FIG. 2 is a diagrammatic elecvational view of a roasting chamber used in the embodiment of FIGS. 1A–1C.

The wall structure of the chamber continues downwardly below bottom wall 24 and defines a bean outlet lock 26. The outlet lock 26 communicates with the interior of chamber 14 through a transfer valve 28 connected to the hole 25 in wall 24 and disposed immediately beneath the bean outlet aperture 24 in screen 18. A further transfer valve 30 (FIG. 1) is provided at the bottom of outlet lock 26 for discharging roasted beans from the outlet lock into a finished product container 32. An inlet lock 34 is connected through a further transfer valve 36 and bean inlet opening 38 to the interior of chamber 14. As best seen in FIGS. 2 and 3, the bean inlet opening 38 communicates with the chamber in the space between top screen 16 and bottom screen 18. The bean inlet lock has a further transfer valve 40 for connecting the bean inlet lock to the a raw bean chamber 44. As best seen in FIG. 3, the roasting chamber is equipped with a central shaft 46 coaxial with the cylindrical wall 12 and with conical screen 18. Shaft 46 has a vaned agitator 48 disposed on its low end and a hub 50 disposed beneath the vaned agitator. The hub is rotatable with respect to the shaft, whereas the agitator is fixed to the shaft. Shaft 46 also has a shutter 52 disposed above top screen 16. Shutter 52 is connected to shaft 46 by a pin joint 53 so that the shutter is connected to the shaft for rotation about the central axis of the chamber. Shaft 46 is provided with an appropriate rotary and sliding seal (not numbered) where it passes through the top wall of the chamber. Shaft 46 is connected to a drive motor 54 (FIG. 1A) for rotating the shaft on its axis and to a pair of pneumatic cylinders 56 for selectively sliding the shaft between the operating position shown and a discharge position in which the shaft is disposed upwardly from the operating position. In the operating position, the hub 50 at the bottom of the shaft blocks the bean discharge aperture 20 in screen 18, shutter 52 disposed immediately above top screen 16 and agitator 48 is disposed immediately above conical bottom screen 18. In the discharge position, the hub 50 and shaft are lifted away form the bean discharge aperture 20. Also, as the shaft is retracted to the discharge position, shutter 52 pivots downwardly relative to the shaft on pin joint 53 so that the shutter does not interfere with the wall of the chamber.

The interior 14 of the chamber is connected to through a selectively operable valve PSV4 and a metering or needle valve NV4 to a gas outlet conduit 60. The chamber 14 is also connected through a selectively operable valve PSV3 and metering or needle valve NV3 to a gas inlet pipe 62. The bean inlet lock 34 is similarly connected through selectively operable valve PSV2 and needle valve NV2 to the gas outlet conduit 60 and through a selectively operable valve PSV1 and needle valve NV1 to gas inlet pipe 62. Likewise, the bean discharge lock 26 is connected through selectively operable valves PSV6 and needle valve NV6 to the gas outlet conduit 60 and through slectively operable valves PSV5 and needle valve NV5 to the gas inlet pipe 62.

Gas outlet conduit 60 is connected through a further selectively operable valve PSV9 to a pressure release tank 64. The pressure release tank is connected to the suction or inlet slide of a gas compressor 66 driven by a motor 68. The outlet of compressor 66 is connected to a pressure storage tank 70 which in turn is connected through a further selectively operable valve PSV7 to gas inlet pipe 62. Pressure storage tank 70 is connected through yet another selectively operable valve PSV10 to a storage tank 72 containing an inert gas such as nitrogen or carbon dioxide. The various pressure vessels, including the pressure storage tank, roasting chamber 14, inlet lock 34 and discharge lock 26 are all connected through pressure release valves to an emergency vent 76. A gas bleed line 78 is connected through a restrictor or needle valve NV7 and a selectively operable valve PSV11 to the gas inlet pipe 62 and hence to pressure storage tanks 70. The bleed line is also connected through a further selectively operable valve PSV8 to gas outlet conduit 60.

Roasting chamber 14 is equipped with a gas inlet 80 communicating with the chamber adjacent to bottom of the chamber, between bottom screen 18 and bottom wall 24. As shown in FIG. 2, gas inlet 80 is connected in an off-center, tangential relation to the chamber, so that gas entering the inlet will be directed in swirling motion around the axis of the chamber. A gas outlet 82 communicates with the chamber above top screen 16. Gas inlet 80 is provided with an ensemble of sensors 84 (FIG. 1A) incorporating a pressure transducer and a thermocouple. Similar sensors 86 are provided in the roasting chamber itself and still further sensors 88 are provided on gas outlet 82.

Gas inlet 80 is connected to the outlet side of a motor driven process gas blower 90. The inlet side of fan 90 (off page connector B in each of FIGS. 1A and 1B) is connected to selectively operable, motor driven-valves HMV1 and CMV1, whereas the gas outlet of the roasting chamber 82 (off-page connector A) is connected to selectively operable valves HMV2 and CV1. Valves CV1 and CMV1 are connected to a flow loop 92 extending through a pair of heat exchangers 94 and 96, so that by opening valves CV1 and CMV1 and closing valves HMV2 and HMV1, the roasting chamber can be connected to loop 92 and hence to the gas side of the heat exchanges. Valves HMV1 and HMV2 are connected to a second gas flow loop 98. Gas flow loop 98 includes a cyclonic separation chamber 100 having a hollow interior space 102 in the form of a surface of revolution about a central axis, an inlet 104 adapted to direct gas into the chamber in a peripheral flow and an outlet 106 connected to the chamber adjacent to central axis thereof so that gas passing through the chamber 102 from inlet 104 to outlet 106 will move in a swirling, cyclonic pattern. Separation chamber 102 tapers to a narrow waste outlet opening 108 at the bottom of the chamber. The waste outlet is connected through a valve 110 to a waste outlet lock chamber 112. Chamber 112 in turn is connected through a further valve 114 to a waste discharge line 116. A shaft 118 is mounted coaxially within chamber 102. Shaft 118 is driven by a motor 120. A scraper 122 is mounted on the shaft so that the scraper will dislodge solids from the inwardly tapering wall of chamber 102. A waste discharge auger 124 is also mounted on the shaft. Auger 124 is arranged to impel solids out of separation chamber 102.

The gas outlet 106 of the separation chamber is connected to the inlet of a further process gas blower 130. The outlet of blower 130 is connected through a selectively operable valve HMV4 to a heat exchanger 132, which in turn is connected back to the outlet side of loop 98, i.e., to valve HMV1. A further selectively operable valve HMV3 is connected in parallel with the heat exchanger 132 so as to provide a controllable by-pass around the heat exchanger. Yet a further valve HV1 is connected in parallel with the entire loop 98 so as to provide a by-pass around roasting chamber.

Separator 100 is equipped with a water-cooling jacket 134 mounted on the wall structure of the separation chamber. The cooling water jacket 134 and the water sides of heat exchanger 94 and 96 are connected to a conventional chiller 136 and circulating pump 138. The chiller may incorporate conventional components such as a gas refrigeration unit with a gas compressor, expansion valve and heat exchangers (not shown) for transferring heat from circulating coolant to the outside environment. The coolant circulation system is equipped with conventional features such as expansion tanks, drain valves and the like (not shown). The gas heat exchanger loop 132 is disposed within a furnace 140 but does not communicate with the interior of the furnace. Stated another way, heat exchanger loop 132 has an impermeable wall which maintains isolation between the process gas and the gasses within furnace 140.

Furnace 140 is heated by a gas burner 142. Burner 142 is connected to a source of combustible gas such as a natural gas utility line, gas tank or the like through a controllable valve GCV1. The gas inlet of the burner is also connected through a further controllable valve GCV2 to the bleed line 78 (off page connector C). The gas supply is provided with conventional safety devices such as pressure switches, a bleed-line and a manually operable by-pass for by-passing the control valve GCV1. A combustion air blower 144 is connected to a flush air supply through a controllable valve ACV1 and connected to the combustion gas outlet 146 of the furnace through a further controllable valve ACV2. A further set of pressure and temperature sensors 148 is connected in loop 98 downstream from the outlet of process gas flow 130.

The combustion gas exhaust stack 146 is provided with an instrument ensemble 150 incorporating a carbon dioxide sensor, oxygen sensor and $NO_x$ sensor. The furnace is also equipped with thermocouples 152 for monitoring combustion temperature. The various sensors, selectively operable valves and other controllable elements in the system are connected through control lines (not shown) to a control computer 154. The control computer may be a conventional digital computer equipped with appropriate conventional interface devices and programmed to perform the sequence of operations discussed below.

In a process according to one embodiment of the invention, the system is flushed with inert gas from tank 72, and brought up to temperature by circulating gas through loop 98 while operating furnace 140. During this start-up phase, the interior of the roasting chamber may be brought to a very high temperature, as, for example, about 750–800° F. (400–427° C.). The system is also brought up to the desired operating pressure, as, for example, about 2.1 MPa. During this process, some of the gas in the system may be vented through bleed line 78 into burner 142 so as to vent contaminants from the system.

Once the system is up to temperature and pressure and free of contaminants, a first charge of green coffee beans is admitted to roasting chamber 12 through inlet lock 34 and bean inlet opening 38. Preferably, bean inlet lock 34 is brought up to the prevailing system pressure by admitting gas from the pressure storage tank 70 before opening valve 36 and passing the beans into the roasting chamber for bean inlet opening 38. Shaft 46 is maintained in the operating position. Valves CV1, CMV1 and HV1 are shut, whereas valves HMV1 and HMV2 are open. Blowers 90 and 130 are activated so as to drive gas through the roasting chamber 14, around loop 98, through separation chamber 102 and through heated exchanger 132. The furnace operates to heat the gas passing through the heat exchanger. The gas passing through blower 90 and gas inlet 80 is admitted as an inlet gas adjacent the bottom of roasting chamber 14. This gas passes through screen 18 and through the charge of coffee beans in chamber 14. The gas passes upwardly through the beans and entrains the beans, lifting some or all of the beans upwardly within the chamber so that beans tend to accumulate on top screen 16. In effect, the upwardly flowing gas converts the mass of beans within the chamber to a fluidized or spouted bed and also drives the beans upwardly against the top screen.

During this process, shaft 46 and agitator 40 rotate within the chamber so as to stir the beans. Shutter 52 sweeps over top screen 16 as the shaft 46 rotates. The shutter momentarily occludes various portions of the top screen in sequence and thus momentarily stops the upward gas flow through each portion of the screen. While the flow is stopped at a particular portion of the screen the beans fall downwardly away from that portion of the screen into the chamber. As the gas flows upwardly through the chamber, it transfers heat to the beans, takes up water and volatile bean constituents from the beans and also entrains solids such as chaff. The gas passes upwardly through the top screen and out of the roasting chamber as exhaust gas through outlet 82.

The exhaust gas passes through separator 100. As the gas passes through the separator, the swirling motion mechanically segregates the solids from the gas. At the same time, the chilled surface of the separator, maintained by the cooling water in jacket 134 abstracts heat from the gas and closes water vapor to condense. The swirling motion of the gas also helps to separate the condensed water vapor from the gas. The gas passing out of the separator returns to heat exchanger and passes back through the blower 90 and back into the roasting chamber as inlet gas. The control computer monitors the enthalpy of the inlet gas using pressure and temperature sensors 84 and also monitors the enthalpy of the exhaust gas using sensors 88, as well as the enthalpy of the gas leaving the separator using sensors 148. The control computer adjusts the amount of heat transferred to the gas by controlling valves HMV4 and HMV3 so as to thereby direct some or all of the gas to by-pass heat exchanger 132.

The control computer also monitors the amount of heat transferred to the means in chamber 14 by monitoring the inlet gas enthalpy and outlet gas enthalpy and also by monitoring the actual temperature of the beans within the roasting chamber. The control computer can also monitor the temperature of the beans by monitoring the temperature of the outlet gas. The temperature of the outlet gas is a close approximation of the temperature of the beans in the chamber. The control computer thus adjusts the amount of heat supplied to the beans so as to maintain a desired time/temperature profile for the roast.

The separated solids and water are discharged from separator 10 by the action of scraper 122 and auger 124. During this procedure, valve 110 may be momentarily opened to allow movement of the solids into discharge lock 112 whereupon this valve is closed and valve 114 is opened to discharge the solids to waste.

As the initial charge of beans approaches the end of the roasting process, the control computer shuts valves HMV1 and HMV2 and opens valves CV1 and CMV1 so as to connect the roasting chamber to the first loop 92 and disconnects it from the second loop 98. Valve HV1 is also opened so as to provide a circulation path around loop 98. Blower 130 continues to circulate gas through loop 98 whereas blower 90 now circulates gas through the roasting chamber and through loop 92, thereby bringing the gas through the heat exchanges 94 and 96. The chilled gas passes though the chamber in the same manner as the heat inlet gas and provides the same effective heat transfer to the beams, thereby cooling the beans rapidly.

At a desired time or bean temperature during the roasting and/or cooling process, the control computer operates valve PSV4 so as to vent the roasting chamber into pressure release tank 64. This venting procedure can provide essentially any desired rate decrease in pressure in the system so as to provide the desired increase in the volume of the coffee beans. However, this venting of the chamber does not discharge gasses from the roaster into the atmosphere. The gasses transferred into release tank 64 are compressed and stored in high pressure stage tank 70. Once the initial charge of coffee beans in the chamber have been cooled to the desired temperature, shaft 46 is retracted upwardly into the discharged position thus removing the hub of the shaft from the bean outlet aperture 20 in screen 18. Transfer valve 28 is opened so that the bean outlet aperture in the screen now communicates with bean discharge lot 26. During this procedure, gas continues to circulate into the chamber through inlet 80. This gas passes upwardly though the screen and helps to agitate the beans on the screen. This assures that the beans will float smoothly down the screen and out through discharge aperture 20, into discharge lock 26. Once the beans are in the discharge lock, transfer valve 28 is closed and shaft 46 is returned to its operating position.

While the beans are in the discharge lock, the discharge lock is vented to the pressure release tank 64 through valve PSV6. This helps to conserve the charge of gas within the system. After the pressure within the discharge lock has been brought down almost to atmospheric pressure, transfer valve 30 is opened to discharge the beans into container 32. A second charge of beans is admitted through inlet lock 34. After admitting the raw beans through valve 40, inlet lock 34 is repressurized with gas from pressure storage tank 70. The beans are then transferred through transfer valve 36 and bean inlet opening 38 into the roasting chamber and the cycle of operations discussed above is repeated. Essentially the same charge of gas remains within the system as successive charges of beans are processed. Volatile constituents from the coffee accumulate in the charge of gas during processing of the first few charges of beans. After the first few charges have been roasted, some of the gas in the system is bled or fed through bleed line 78 and passed into a burner 142, where the volatile constituents are incinerated. Combustion conditions in burner 142 are controlled by adjusting parameters such as the amount of combustion products recycled through valve ACV2, the amount of fresh air emitted through valve ACV1 and the amount of bleed process gas admitted through valve GCV2. As further discussed below, these control procedures desirably maintain the burner at about an 8% oxygen level to promote stable combustion with minimal nitrous oxide formation.

The system described above provides several benefits and features. Use on top of the roaster of a screen that contains holes small enough to retain beans, but large enough to pass gas-propelled chaff., is particularlly desirably because it prevents entrainment-induced losses of roasting beans and allows use of gas velocities that are high enough to form a bubbling fluidized bed of beans or cause upward entrainment and transport of beans.

Large particles, such as coffee beans, when subjected to upward flow of gas at velocities high enough to induce fluidization, form bubbling-fluidized beds instead of uniform, smoothly expanding beds. These beds contain solids-free or solids-lean bubbles of gas embedded in a denser matrix containing slightly-expanded arrays of fluidized particles. The bubbles rise through the bed, promoting mixing, and burst and escape when they reach the top of the bed. As inlet gas velocity increases, gas velocities in dense regions in the bed rise only slightly above the minimum fluidization velocity (the minimum velocity at which gas-flow-induced bed expansion occurs) but more and more bubbles form, the bubbles get larger and their rise velocity increases. Hot gas transported upward through the bed in bubbles partly bypasses particles and does not effectively transfer heat to them. Therefore a significant part of the entering hot gas's heat content is not effectively utilized in bubbling fluid bed roasters. The effectiveness of gas-heat-content utilization decreases as velocity increases and bubbling becomes more severe. At high gas velocities, beans, unless otherwise restrained, will be carried out of a roaster containing a bubbling fluidized bed because: a) beans are ejected when gas bubbles rise the surface of the bed and burst; b) slugging occurs (i.e. dense layers of beans are lifted by rising gas bubbles occupying the entire width of the roaster); and c) the large volume of gas bubbles present causes bed volume to expand and exceed the volume of the roasting chamber. Such expansion can occur even in roasters designed to accommodate moderate flow-induced bed expansion and the bean expansion produced by roasting. Therefore, only moderately high gas velocities could be used in previously developed, deep-bed fluidized-bed coffee roasters. Non-productive excess roaster depth could be provided, but providing such depth would be excessively costly in pressurized equipment, and excess depth still would not permit use of velocities high enough to cause bean entrainment. Shallow fluidized beds with great amounts of head space have been used to roast coffee by Nutting et al. (U.S. Pat. Nos. 3,572,235 and 3,595,668) and Brandlein et al. (U.S. Pat. No. 4,737,376). Use of such beds prevents bean carryover except at velocities high enough to cause entrainment, but requires large amounts of floor space and equipment with a large cross sectional area. Therefore, shallow beds can not be economically used for pressure roasting. Further, such beds are too shallow to permit nearly complete transfer to beans of the available heat content of the gas passing through the bed.

Exit gas temperatures in fluidized-bed roasters can fall no lower than the instantaneous, mean bean temperature if the bed of beans is well mixed. Therefore, the available heat content per unit mass of gas (i.e the maximum amount of heat that a unit mass of gas can transfer to beans) is:

$$C_p(T_{in}-T_B),$$

where:

$C_p$ is the heat capacity of thegas, $T_{in}$ is its inlet temperature and $T_B$ is the bean temperature at the time.

The bean-retaining top screen used in the preferred roasters according to the present invention prevents roasting beans from being carried away by high-velocity roasting gas and loss of roasting beans due to bed expansion, slugging and bursting of bubbles emerging from the fluidized bed. The screen will also retain roasting beans in place as a suspended dense bed when very high velocity gas flows are used. At somewhat lower velocities, the roaster will contain a screenrestrained suspended layer of beans on top of a bubbling fluidized bed. All gas flow will pass through uncovered portions of the suspended region of the bed without bypassing beans contained in that region. Thus, bean heating in the suspended or partly suspended bed will be far more efficient than in a bubbling fluidized bed or a shallow fluidized bed.

Use of a rotating or otherwise moving shutter that blocks flow through part of the top screen provides further enhancement. Beans pressed by gas flow against the top screen tend to remain in place on the top screen. If they remain in place, the beans will roast rapidly but unevenly. The bottom layer of beans will be exposed to the hottest roasting gas and will roast fastest. As each layer of beans takes up heat it will partly cool the gas passing through it, so that the top layer, being exposed to the coolest gas, will roast slowest. The moving shutter cuts off gas flow through a continuously shifting sector of the bed as it rotates over the screen. This causes beans in the blocked sector to fall and mix with each other and other beans so that the roasting rate is evened out. Cyclical, shutter-induced, local flow interruption also improves bean mixing when fluidizedbed rather than suspended-bed roasting is used, and permits any beans that have been carried up to the top screen and held there by gas flow to reenter the fluidized bed. The rotating shutter also reduces bubble growth, causes in-bed bubble collapse and helps prevent formation of bubbles large enough to induce slugging.

The preferred systems according to the present invention can efficiently use much higher gas mass-flow rates than used in other fluidized bed roasters. As previously noted, gas passing through fluidized beds as bubbles largely bypasses the solids in such beds. Therefore, part of the hot gas passing through high velocity fluidizedbed coffee roasters does not transfer heat to beans in the roaster. Further, the fraction of gas passing through typical fluidized-bed coffee roasters in the form of bubbles increases as the inlet gas velocity increases. Thus, in fluidized-bed roasters, increases in gas flow rates do not result in commensurate increases in roasting rate. Examination of roasting rates achieved in previously used fluidized bed roasters where very high gas flow rates have been used clearly indicates poor utilization of the heating power of the gas used. In the preferred embodiments of the present invention, however, a restrained, suspended bed of coffee beans forms when very high velocity gas flows are used, and gas passes uniformly through that bed without bypassing. The moving shutter ensures uniformity of roasting by causing mixing in the suspended bed. Since gas density is proportional to gas pressure, use of high gas pressure in the preferred roasters according to the present invention provides substantially higher gas mass-flow rates and gas heat-carrying capacity than would be achieved at atmospheric pressure at equal gas velocity. Moreover, higher fluidization-inducing gas velocities can be used before bubbling starts. Therefore, in the preferred embodiments of the present invention: a) very high hot-gas mass flows can be used without causing bean losses; b) heat transfer is more rapid than in other fluidized-bed roasters and the heat content of the gas is utilized in a more effective manner, c) more rapid roasting is or can be achieved; and/or d) as described later, roasting involving bean temperature versus t!rne programming can be carried out readily by programming the inlet roaster gas temperature versus time.

Though increasing the hot gas mass-flow rates when heat transfer is efficient will provide faster roasting up to moderately fast gas mass-flow rates, increases in roasting speed progressively decrease as gas mass-flow rates, and hence gas velocities, increase further. At extremely high gas mass-flow rates and gas velocities, roasting speed asymptotically approaches a maximum attainable rate. For the reasons discussed above, it is preferred to use gas velocities on the order of 0.5 meters/sec or more, and most typically about 0.5–2.5 meters/sec.

Figure 4:
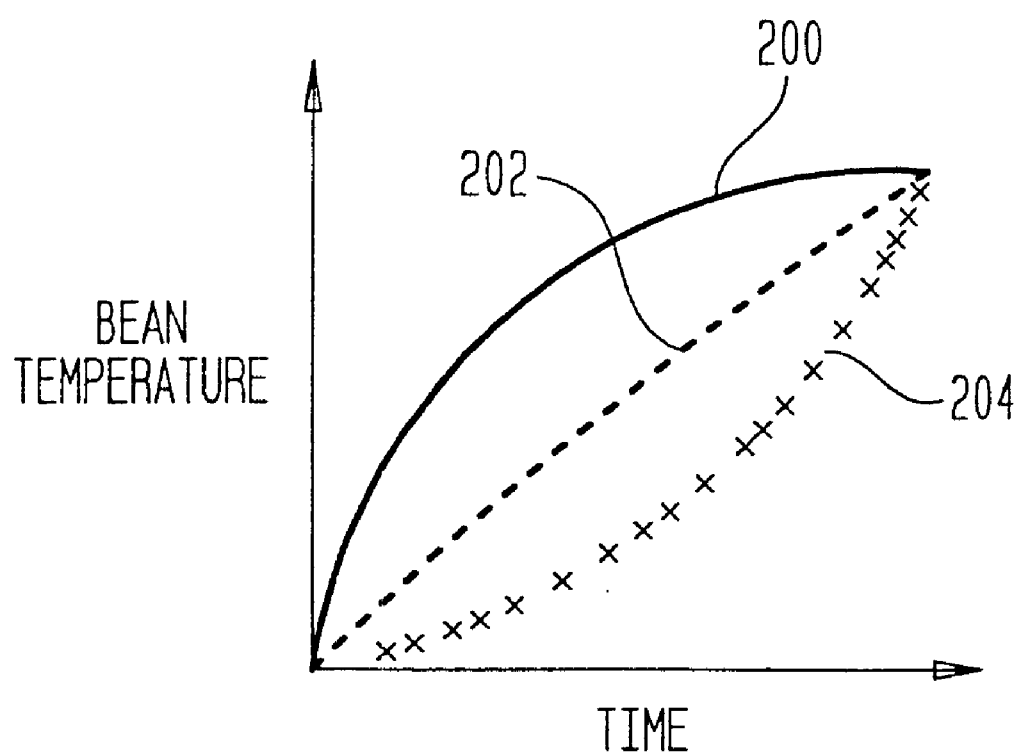
FIG. 4 is a graph illustrating certain time-temperature profiles.

The most preferred processes according to the present invention use gas temperature versus time profiles that provide bean temperature versus time profiles that reproducibly provide roasted coffees with selected desired flavors. The controlled bean temperature versus time profiles can include profiles of low convexity and concave profiles even when short roasting times are used. As further explained below, a "convex" profile means that the curve of bean temperature versus time rises rapidly during the early stages of the process and more slowly during the later stages of the process, producing the convex curve 200 illustrated in solid line in FIG. 4. A less convex profile 202 has a more nearly uniform slope, whereas a concave profile 204 has a slope which increases with time.

Large groups of series and parallel reactions are involved in developing roasted coffee flavor. For each given type of coffee or blend of green coffees, the relative rates and extents of these reactions and, consequently, the flavor of roasted coffee depend on the temperature-versus-time history of beans during roasting. In spite of this, coffee is usually roasted by using a single, preselected roasting-gas inlet temperature or, at most, one or two preselected step-changes in Inlet temperature. The roast is stopped when the bean temperature reaches a preselected end-of-roast value. The inlet gas and end-of-roast temperatures are selected to provide desired roasting time, degree of ropst darkness (roast color) and a roasted bean taste that fairly well satisfies some group of users of roasted coffee.

The present inventor has found that roasted coffee having desired, precisely controlled flavors and roast colors can be reliably produced by controlling coffee-bean temperature-versus-time history during roasting, i.e. by using the bean temperature-versus-time history appropriate for the desired type of roast. Roasted beans with the same flavor and color, can be produced roast after roast, by providing the same bean temperature-time history during each roast. Moreover, roasted coffees with different desirable flavors can be reliably produced by using experimentally-determined bean temperature-time histories. The preferred systems according to the present invention provides means for accurately reproducing those histories.

In coffee roasting, as conventionally practiced, the temperature of coffee beans approaches the inlet temperature of the hot gas used to supply heat to the beans. Usually, a constant or nearly constant inlet gas temperature and gas flow rate is used. Under such circumstances, the instantaneous rate of bean temperature rise tends to be proportional to the current difference between the bean temperature and the gas temperature. Though other factors somewhat complicate the process, bean temperatures tend to rise most rapidly at the start of roasting, when the difference between gas temperature and bean temperature is greatest, and rise most slowly near the end of roasting, when the difference between gas temperature and bean temperature is smallest. The water content of the bean evaporates during roasting. Supplying of latent needed to sustain such evaporation slows the rate of temperature rise over the bean temperature range where most water is lost, i.e. between 170° F. and 240° F. (between 77 and 116° C.). Further, exothermic reactions occur near the end of roasting, i.e. at bean temperatures greater than 360° F. (182° C.), and tend to cause bean temperature to rise faster than otherwise anticipated.

Disregarding these complicating factors for the moment, let us consider bean heating rates in two situations, In both cases, beans enter the roaster 70° F. (21° C.) and leave at 420° F. (216° C.). In one case, an inlet gas temperature of 750° F. (399° C.) and a gas mass-flow rate that exposes each Kg of beans to three Kgs of hot air during the roast are used. In the other case, an inlet gas temperature of 480° F. (249° C. ) and a gas mass-flow rate that exposes each Kg of beans to fifteen Kgs of hot air at fluidizing condition during the roast are used. In the first case, roasts are completed in 12 minutes and, in the second case, in three minutes, in the first case, the initial rate of bean heating will tend to be (750–700)/(750–420)=2.1 times as fast as the final rate. In the second case, the initial rate of bean heating will tend to be (480–70)/(480–420)–6.8 times as fast as the final rate. Convex-upward bean-temperature-versus-time curves will be obtained in both cases, but in the second case, the convexity will be markedly greater. Thus, fast roasting methods used to date provide bean-temperature-versus-time curves that are markedly more convex than previously used slower roasting methods. Because of the difference in roasting time and bean-temperature-versus-time curve shape, the chemical composition and taste of fast-roasted coffees are different from those of slow-roasted coffees, even when the final roast color is the same.

The present inventor has found that roasted coffees with highly desirable flavors can be produced by using bean-temperature-versus-time profiles that differ markedly in shape from those obtained by normally used roasting methods. These Include profiles that are markedly less convex than profiles now produced by fast roasting. Some coffees with highly desirable tastes have been produced by using concave-upward bean-temperature-versus-time profiles, i.e. by using bean temperatures that rise slowly at the start of the roast and then rise sharply at the end of a roast. The present pressure roaster and its heat transfer enhancing features can provide heat transfer capability that permits controlled bean-temperature-versus-time profiles, including less-convex profiles and concave-upward profiles; to be obtained by controlling the inlet-temperature-versus-time behavior of the roaster gas used to heat the beans. Without the present roaster's great heat-transfer capability short-duration roasts characterized by bean-temperature-versus-time curves of reduced convexity or concavity could not be obtained.

The instrumentation arrangements, control hardware discussed above, together with the software discussed herein facilitate control of the bean-temperature-versus-time curve in this manner. As further discussed below, the control software implemented by the control computer can calls for gas temperature and flow rate data and uses that data to determine bean temperature-versus-time behavior. It also activates gas heating control hardware that adjusts the gas temperature in ways that minimize deviations between the determined and desired bean-temperature-versus-time behavior.

Instead of inlet gas temperatures that are high from the start of roasting, as used in previously utilized roasters, inlet-gas temperatures that increase gradually with time often will be used in the present roaster, and use of such gradually increasing roaster-inlet gas temperatures constitute a further aspect of this invention.

If very high mass flows of gas are used, gas-bean contacting and heat transfer Is efficient and beans are well mixed, as in the preferred embodiments of this invention, and the temperature of the gas entering the roaster rises smoothly and not excessively ragidly, the mean temperatures of the coffee will, with a time lag, exhibit almost the same history-versus-time as the gas. In such cases, desired bean temperature-versus-time profiles can be conveniently provided by using gas temperature-versus-time profiles of almost the same shape. This method of bean-temperature-versus-time profile control can be used more readily and for higher rates of gas temperature rise in the present roaster than in other roasters because of the present roaster's ability to transfer large amounts of heat rapidly, efficiently and uniformly.

The size of the time or temperature lag between beans and the gas will depend on the size of the beans, their thermal conductivity, the gas mass-flow rate per unit mass of beans and the current rate of gas temperature rise. The size of the lag can be predicted from mean gas temperature-versus-time profiles by using equations governing unsteady state conductive heat transfer in the beans. Further, if suitable evaporation rate and exothermic heat production data are available or become available, gas temperature-versus-time profiles designed to produce given bean temperature profiles can be predicted fairly reliably. If evaporation rate and exothermic heat production data are not available, deviations between experimentally determined bean temperature versus time profiles and profiles that are theoretically predicted by uncorrected heat-transfer analysis can be measured during roasting of one or more test batches. This experimental data can be used to determine how heat consumption due to evaporation and exothermic heat production affect the bean-temperature-versus-time profile, and to correct subsequently used gas-inlet-temperature-versus-time profiles so as to account for such heat use and production and exactly provide desired bean-temperature-versus-time profiles.

Use of a cyclone with a wall is cooled by chilled water provides still further enhancements. Gas leaving the roaster chamber passes through a cyclone separator, such as separator 100, having walls cooled by chilled water circulating through attached heat-transfer panels. The cyclone simultaneously serves to remove chaff from the circulating roaster gas and condense gas entrained water vapor that has evaporated from roasting beans and water that has been generated by roasting reactions. As in other chaff-collection cyclones, roaster gas tangentially injected into the cyclone at its top flows at high velocity along spiral paths as it passes through the unit, and, in doing so, generates centrifugal force, which causes chaff to move outward and deposit on the cyclone wall. Water vapor condensing on the chilled wall of the cyclone wets the deposited chaff, thereby preventing turbulence-duced reentrainment of chaff in the roaster gas. The rotating scraper 122 and rotating helical screw 124 propel the wetted chaff through the discharge opening 108 and into discharge lock 112. Chaff will be discharged through this lock on a cyclical basis every time a selected number of roasts (e.g. ten) have been processed.

The scraper may adversely affect the air flow pattern in the cyclone and produce turbulence which will tend to reduce the effectiveness of chaff collection. To alleviate this problem, the scraper should be shaped to minimize its aerodynamic frontal area and to provide a strealined shape. Alternatively or additionally, the scraper, the helical screw or both may be held in a retracted position, outside of the cyclonic separation chamber during normal operation of the cyclone and extended into the chamber only when chaff is to be ejected.

Water condensation removes water vapor that would otherwise accumulate in the roaster system and cause pressure rises. Furthermore, the water could change the roaster gas composition in ways that induce undesirable reactions, such as hydrolyses that excessively increase bean acidity. In some cases, e.g. when roasting robustas, which benefit by steam roasting, or when trying to limit bean moisture loss, water vapor's presence may be desirable. In such cases, the cyclone wall temperature will be adjusted to maintain desired water partial pressures in the roasting system. As most water vapor is generated early in the roasting process and most of the chaff is released at late stages of roasting a substantial portion of the water vapor may concense and drain away before chaff deposits on the cyclone wall.

The chilled cyclone acts as a heat sink, which helps improve roasting gas temperature control. In certain cases, e.g. when high temperature cleaning cycles are used or when exothermic roasting reactions cause roasting gas temperatures to rise, the normal method of roasting gas temperature control, i.e. controlled bypassing of gas around the roasting gas heater, will not provide suitably low inlet gas temperature. In such cases, heat removal through the chilled cyclone wall will be used to automatically reduce the gas temperature. Similar cooling could be provided by utilizing the gas cooling system used for roast quenching, (heat exchangers 94 and 96) but this would require use of a set of controls that implement a series of flow path changes. The chilied cyclone, on the other hand, can function automatically In conjunction with the normal gas control system without any need for such flow path changes.

Controlled, limited roaster-gas venting helps to prevent excessivip accumulation in the roasting system of roasting generated gases and volatile organics. When the roaster systems described above are first charged, the gas they contain will consist almost solely of nitrogen, plus a slight amount of oxygen that enters with air mixed with the entering beans. As roasting proceeds, carbon dioxide and other gases and volatile compounds generated by the roasting process will mix with the nitrogen. Closed-loop roaster-gas circulation will be used during roasting and roaster gas will be retained in storage tanks when the system is shut down. Because of this, the great bulk of the roasting gas will be retained in the system both during roasting and when the system is shut down. Therefore, as successive roasting cycles occur, more and more roasting-produced gases and volatiles will tend to accumulate the roasting system. This will progressively change the nature of the roaster gas unless countermeasures are taken. Due to incomplete transfer of roaster gas from the bean feed and discharge locks to the roaster gas storage tank, there will be slight losses of gases and volatiles produced by roasting whenever these locks open to the atmosphere to receive or discharge beans. Some roasting produced volatiles will also condense along with water on the chilled walls of the cyclone. Aside from volatile acids, e.g. acetic acid, the relative volatilities of coffee aroma compounds with respect to water are very great. So, except for volatile acids, very small fractions of the aroma compounds produced by roasting will condense on the cyclone walls. These sources of gas and aroma escape and removal normally will not be sufficient to prevent roasting-generated gases and organic volatiles from reaching excessive levels in the roaster gas.

To prevent this, controlled portions of roaster gas can be vented during the bean cooling period that follows each roast. As discussed above, the gas can be vented directly from the roasting chamber or, preferably, from the pressure storage tank 70. Alternatively or additionally, gas can be vented from the cyclone and furnace jacket, which are not connected to the roaster during the cooling of beans. The vented gas will be replaced by an equal volume of pressurized clean nitrogen.

The amount of gas that is vented can adjusted so as to produce desired types of roasting environments. Thus if a very clean roasted coffee taste is desired, venting that provides high levels of volatiles removal will be used; but, if a smoky taste or other taste produced by heat-induced aroma reactions is desired, low levels of volatiles removal will be used.

Roasting generated volatiles and gases will not be present at the beginning of the first roast, and it will take several roasting cycles for roasting generated volatiles and gases to build up to desired levels. Roasting gases will be retained or stored in the system. Therefore, after the first few roasts following the initial startup, it will be possible to maintain desired roasting environments for all subsequent roasts, including roasts made after shutdowns that are not excessively long.

Organic volatiles contained in vented roaster gas can be oxidized by mixing that gas with the gas mixture entering the burner of the furnace used to heat roaster gas. During this procedure, the flame temperature of the burner desirably is raised to about 1400° F. (760° C.). This will substantially oxidize the volatiles, effectively eliminating them as pollutants.

Catalytic combustion and/or afterburning are used conventionally to oxidize volatile organics discharged from coffee roasters. In conventional roasters, these units operate during the entire roasting cycle. In the preferred systems according to the present invention, the period of venting and high temperature burner operation will be very small compared to the total roasting cycle. Therefore, treating organic volatile discharges produced by use of this invention will require much less energy and be much less costly than currently used means for disposing of such volatiles.

The hot gases produced by the furnace during venting can be used to heat roaster gas to 750° F. to 800° F. (398–427° C.). This extra-hot roaster gas can be circulated through loop 98 while that loop is isolated from the roasting chamber itself so as to drive off or burn off condensed water, coffee oil, chaff and other deposits from the cyclone and other parts of the roaster gas circulation loop, except for the roaster itself. To accomplish this, the venting process can be carried out while loop 98 is isolated from the system. The complete roasting system, including the roaster, will be exposed to the extra-hot roaster gas prior to running the first roast when the system is first started up and when it is started up after long shut-downs. This heating will serve to drive off or burn off any contaminants contained in the system. it will also serve to quickly bring the roasting system up to operating temperature, so that abnormal roasts will not be produced during the first few roasting cycles following a startup. A similar, but briefer, thermal cleaning of the complete roasting system, including the roaster, can be carried out every time a selected number of roasting cycles (e.g. ten) have been completed.

Use if controlled recycling of furnace discharge gases and mixing of those gases with the fuel-air mixture entering the furnace burner to produce a fuel-air mixture that contains about 8% oxygen provides stable combustion and combustion products that contain much smaller amounts of nitrogen oxides than normal furnaces. Discharge temperatures of burned gas leaving the roaster gas heat exchanger in the furnace through outlet 146 are monitored and used to automatically control the amount of fuel supplied to the furnace burner. The fuel gas delivery rate is automatically increased a correct amount if the discharged burned gas temperature is too low and the fuel rate will be automatically decreased a correct amount of the discharged burned gas temperature Is too high. The fuel-gas flow-rate controller is linked to the controller regulating air inflow to the burner so that enough oxygen will be supplied to completely burn the fuel and insure that carbon monoxide is not produced. Stated another way, the air inflow control is responsive to the fuel inflow rate as set by the fuel inflow control. Carbon monoxide, oxygen and nitrogen oxide levels in the discharged gas will also be continuously measured to make sure that the furnace is functioning well and that undesirable amounts of carbon monoxide and nitrogen oxides are not being emitted. If the carbon monoxide level is too high the air:fuel ratio will be automatically increased; and if carbon monoxide levels are adequately low, but too much residual oxygen is present, the air:fuel ratio will be decreased.

Controlled amounts of furnace discharge gas will be recycled and mixed with the fuel-air mixture entering the burner. The oxygen content of the mixed recycled gas, fuel and air will be measured and used to automatically control the amount of discharge gas recycling so that the mixture feed to the burner contains about 8% oxygen. Fuel-recycled gas-air mixtures containing this oxygen level will burn stably but produce very much less nitrogen oxides than typical fuel air mixtures, which contain much more oxygen. The furnace used in preferred embodiments of this invention differs from furnaces previously used for heating of roaster gases in that the recycled discharged gas passes through the burner flame, whereas in previously used furnaces, the recycled gas mixes with burned gas after the flame. Oxygen concentrations approaching 21% generally have been used in fuel-air mixtures utilized in previously used furnace burners, and nitrogen oxide production consequently is much greater in such furnaces.

The furnace used in the preferred embodiments of the present invention heats roasting gas indirectly, through the wall of heat exchanger tubing 132, rather than directly, as in most coffee roasters. Indirect heating, as used in this roaster, prevents volatiles contained in recycled roasting gas from being exposed to high temperatures that cause undesirable reactions whose products then contact the roasting beans. It also prevents roasting beans from contacting fuel combustion products that adversely affect roasted bean taste. Certain previously utilized roasters that have used indirect heating of roasting gas, such as the roasters patented by Horace L Smith Jr., but much higher furnace gas temperatures are used for protracted periods in those roasters. In the preferred embodiments of the present roaster, high furnace and roasting gas temperatures are used only during thermal cleaning and vent-gas burning.

The control software used in preferred embodiments of the present invention can use gas enthalpy balances about the roaster to continuously determine and control the amount and rate of heat delivered to roasting beans and the temperature versus time history of the beans, and can also be used to determine when roasting should be stopped. Pressures and temperatures in the gas flow lines entering and leaving the roaster will be measured. The pressure and temperature of the gas entering the roaster and the equation of state for the gas to will be used to automatically determine the entering gas's density. Instantaneous velocities of gas flow into the roaster will be measured by a gas-flow meter. If an orifice meter is used, gas velocities will be automatically computed based on the pressure drop across the orifice and the entering gas density. The gas density will be automatically multiplied the measured velocity and flow area to provide G, the mass flow rate of gas passing through the roaster. Q, the amount of heat that has transferred from the gas to the roasting beans and roaster hardware up to time t, will be automatically determined from the following equation $$Q = \int_0^t \left[ \int_{T_{out}}^{T_{in}} G C_P dT \right] dt$$

where:

$T_{in}$ is the temperature of the gasentering the roaster at time t;

$T_{out}$ is the temperature of the gas leaving the roaster at the same time; and $C_p$ is its heat capacity at gas temperature T.

Thermocouples can be embedded in the wall of the roaster and in its top and bottom flanges, i.e., adjacent the gas inlet and gas outlet. The extent of rise in temperatures measured by these thermocouples can be used in conjunction with a previously determined value of the effective thermal mass of the roaster to determine $Q_R$, the net amount of heat transferred to the roaster. Temperature versus time measurements made using thermocouples implanted at the inner and outer surface of insulation surrounding the roaster can be used in conjunction with the known thermal conductivity of the insulation to determine $Q_L$ the amount of heat passing out of the roaster through the insulation. $Q_B$, the amount of heat picked up by the beans can be computed from the following equation $$Q_B = Q - Q_R - Q_L$$

where Q, $Q_B$, $Q_R$ and $Q_L$ are cumulative values that exist at time t. In some cases, $Q_B$. versus time profiles will be used to monitor and control the course of the roast. In other cases, the bean temperature $T_B$ and its variation with time will be followed by computeractuated numerical computation based on use of the following equation:

$$(T_B)_n = (T_B)_{n-1} + (Q_B)_n n/(B\ C_B)$$

where $(T_B)n$ Is the bean temperature at the end of nth time interval, $(T_B)_{n-1}$ is the bean temperature at the end of (n−1)st time interval, $(Q_B)_n$ Is the change in $Q_B$ in the nth time interval, B is the initial weight of the beans, and $C_B$ is an effective bean beat capacity per unit of initial bean weight. $t_n$, the time after the nth time interval, =n·t, where t is the constant length of the time interval used in all time-based computations. These computations can be carried out using control computer 154 loaded with software designed to access and log the data referred to above and to implement these computations. The software is arranged to take the appropriate control actions bases on the results of these computations. For example, if the computations indicate that the bean temperature is trending higher than the desired time-temperature profile, the control computer acts to reduce the temperature of the inlet gas, as by diverting more gas around the heat exchanger, through the bypass valve HMV3.

$C_B$ is affected by sensible heat changes, by latent heat changes that occur over ranges of temperature and by roasting-induced changes in bean weight. Bean weight losses during roasting cause decreases in $C_B$ $C_B$, is initially greater for beans with a high initial moisture content. Evaporation of water early in the roasting cycle increases $C_B$ over the temperature range where that evaporation occurs; and exothermic heat production during late stages of roasting decreases $C_B$ over the range where that heat production occurs. Since these changes are functions of temperature, $C_B$ will be a strong function of temperature. In addition to evaporation, reaction and weight-loss induced changes, $C_B$. tends to increase slightly with temperature because heat capacities for solids generally increase somewhat with temperature. It is difficult to predict values for $C_B$ and how those values will change with temperature. Nevertheless, $C_B$ can be determine as a function of temperature with a fair degree of accuracy by differential scanning calorimetry. $C_B$ may also be determined by comparing enthalpy-balance-based dQ/dt data with $dT_B/dt$ data obtained from heat-transfer analysis as described above. Since certain coffee roasting reactions are functions of temperature time histories, $C_B$ may be also a function of temperature-time history as well as the beans current temperature and moisture content.

Both regular yield and expanded high yield coffee can be produced in the roaster according to preferred embodiments of the invention. Each type of coffee is normally packed in a standard-sized can or bag. In the United States, that container holds 16 ounces of regular-yield coffee, 13 ounces of moderately expanded high-yield coffee and 11.5 ounces of greatly expanded high-yield coffee. The bulk densities of these coffees, when ground, are: 0.413 to 0.420 grams/cm$^3$ for regular coffee, 0.360 to 0.370 grams/cm$^3$ for moderately expanded coffee and 0.33 to 0.34 grams/cm$^3$ for highly expanded coffee. Controlled venting will be used to produce roasted coffee beans that satisfy these ground-coffee bulk-density requirements.

High pressures develop inside coffee beans during roasting. These pressures depend upon the residual water content of the beans, how much carbon dioxide and volatiles have been produced during roasting, how much of the produced carbon dioxide and volatiles is retained inside beans and the temperature of the bean. The higher the temperature, the greater the internal pressure. Temperature also affects the yield strength of cell walls in the beans and effective "viscosity" or flow resistance of the walls when polysaccharides they contain effectively melt or rise above their glass-transition temperature. The higher the temperature, the lower the cell wall yield strength and viscosity. Roasting beans expand when the difference between the internal pressure and external pressure causes stresses the exceed the cell wall yield stress. This happens when the temperature is high enough to provide high internal pressures and simultaneously lower the wall yield stress enough to permit these pressures to cause expansion.

In the preferred embodiments of the present roaster, as opposed to a normal atmospheric pressure roaster, pressures inside roasting beans are counterbalanced by external pressure. This helps prevent gas loss from beans during roasting, but also diminishes the pressure difference driving expansion. Moderately rapid to rapid venting will be used to create pressure imbalances that drive expansion. Since cell wall yield strength, cell wall flow resistance and the pressure driving expansion depend on bean temperature, venting will carried out when the beans reach a selected temperature during cooling. High temperature venting, i.e. earlier venting during cooling, will be used to produce greater expansion and low bulk densities and lower temperatures, i.e. later venting during cooling, will be used to provide smaller expansion and higher bulk densities. The extent and rate of venting will be controlled to fine tune the extent of expansion, i.e. pressure in the roaster will be reduced to a greater extent and more rapidly to increase expansion. The roaster itself will be isolated from the rest of the roaster gas circulation system during venting and roaster gas will be transferred from the roaster to the low-pressure release tank 64 until the roaster pressure reaches the level desired. The control valve NV4 in transfer line will be used to regulate the venting rate.

The final pressure achieved is limited by the roaster volume:gas storage tank volume ratio, i.e. $P_{fm}$. The minimum final pressure achievable is:

$$P_O \cdot V_R/(V_S+V_R)$$

where $P_O$ is the pressure in the roaster just prior to venting, $V_R$ is the roaster volume and $V_S$ is the pressure release tank volume. Based on the volumes of the low pressure storage tank and roaster, $P_{fm}$ as low as 1 bar gauge can be readily provided when $P_O$=10 bar gauge.

To accelerate the remainder of the cooling process, the roaster will be repressurized as soon as the beans cool enough to stabilize the expanded bean structure when external pressure is increased.

The high pressure, oxygen-free roasting atmosphere helps prevent cell rupture and gas, aroma and volatile flavor outflow from coffee beans during roasting, thereby retainingin roasted coffee beans desirable aromas and volatile flavors that would otherwise be lost.

A burst of carbon dioxide, aroma and volatile flavor release occurs shortly before the end of roast when coffee is roasted at atmospheric pressure. This occurs either because the walls of some cells rupture or burn through, or cell wall permeability increases when cell walls melt and/or stretch and excess internal pressure drives gas and entrained vapor out of cells with ruptured, burned or highly permeable walls. The high pressures used in the preferred embodiments of the present roaster will counterbalance internal pressure and thereby prevent or reduce cell wall rupture and gas outflow. Use of an oxygen-free atmosphere will prevent cellwall burn-through. Therefore more aroma and volatile flavor will retained in coffee beans roasted in the preferred embodiments of the present system than in most currently employed coffee roasters. Also, because less wall material is burned, the bean weight loss caused by roasting will decrease.

Numerous variations and combinations of the features discussed above can be utilized without departing from the invention as defined by the claims. For example, while the shutter in the roaster discussed above moves with rotary motion, similar results can be achieved using a sliding or oscillating movement. Also, while the separator discussed above uses cyclonic action to remove solids, other types of solid-gas separation can be used as, for example, baffles arranged so that the flowing gas impinges on the baffles. Further, while the preferred system disclosed above uses numerous features of the invention in combination, these features also can be employed separately. Moreover, it should also be appreciated that, while the present specification discusses the apparatus and process principally in terms of processing the coffee beans, the same apparatus and essentially the same procedures can be used for processing other plant materials which are required for roasting development of their flavor, as for example, chicory, cocoa, and other particulate materials, preferably bean-like materials. The invention also can be applied to roasting of bean-like materials after grinding.

What is claimed is:

1. A method for roasting beans comprising:

charging a charge of beans into a roasting chamber having a top and bottom;

directing a hot inlet gas into the chamber to thereby supply heat to the beans and cause the beans to be roasted whereby the gas flows upward toward the top of the chamber;

trapping beans which are carried upward in the chamber by a screen disposed adjacent the top of the chamber;

discharging an exhaust gas including roasting byproducts from the chamber;

arranging a movable shutter above the screen capable of blocking gas flow through the screen;

moving the shutter to selectively block gas flow through different portions of the screen such that beans held in engagement with the screen by the flowing gas are released from engagement with the screen at that portion of the screen at which the shutter is blocking the gas flow and fall downward to the bottom of the chamber; and discharging the roasted beans from the chamber.

2. A method as claimed in claim 1, wherein the hot inlet gas consists predominantly of non-reactive gas components which are substantially non-reactive with the beans.

3. A method as claimed in claim 2, wherein the non-reactive gas components are selected from the group consisting of nitrogen and carbon dioxide.

4. A method as claimed in claim 1, wherein said step of directing hot inlet gas into the chamber includes the step of directing the gas into the chamber at a flow rate sufficient to entrain at least some of the beans in the gas flow through the chamber and cause the entrained beans to rise to the screen.

5. A method as claimed in claim 4, further comprising the step of selecting the flow rate to provide a gas velocity of at least about 0.5 meters/sec in the chamber.

6. A method as claimed in claim 1, further comprising the step of reheating at least some of the exhaust gas and passing the reheated exhaust gas back to the chamber in the inlet gas, said reheating being accomplished by passing the exhaust gas through a heater that generates heat and transfers it to the exhaust gas through an impermeable wall.

7. A method as claimed in claim 6, wherein said reheating step and said step of directing inlet gas into the chamber are performed by passing a charge of gas through a substantially closed gas circulation system including the chamber so that the charge of gas is substantially retained within the circulation system.

8. A method as claimed in claim 7, further comprising the steps of:

discharging the charge of beans from the chamber;

reloading the chamber with a new charge of beans while substantially retaining the charge of gas within the circulation system, and repeating cyclically so as to roast a series of charges of beans while substantially retaining the charge of gas within the circulation system.

9. A method as claimed in claim 8, wherein the circulation system includes a closeable branch containing a cooler, the method further comprising the step of cooling each charge of beans within the chamber prior to discharging that charge of beans from the chamber by circulating a portion of the charge of gas through the closeable branch of the circulation system containing the cooler and the chamber without circulating such portion of the charge of gas through the heater.

10. A method as claimed in claim 8, further comprising the step of venting a selected portion of the charge of gas.

11. A method as claimed in claim 10, wherein said step of venting a selected portion of the charge of gas is performed so as to vent little or no gas during roasting of one or more early charges until the gas within the circulation system attains a desired level of volatile bean products and then vent more gas during roasting of one or more later charges so as to maintain the level of volatile bean products within the gas substantially constant.

12. A method as claimed in claim 8, wherein said step of directing hot inlet gas into the chamber is performed while maintaining the chamber under a first superatmospheric pressure, the method further comprising the steps of reducing the pressure within the chamber to a pressure below the first superatmospheric pressure by transferring gas from the circulation system into a pressure release tank prior to discharging each charge of beans from the chamber and subsequently reintroducing gas captured in the pressure release tank into the circulation system.

13. A method as claimed in claim 12, wherein said reintroducing step includes the steps of pumping gas from the pressure release tank into a pressure storage tank and holding the gas in the pressure storage tank at a pressure above the pressure prevailing in the circulation system, and directing gas from the pressure storage tank into the circulation system.

14. A method as claimed in claim 1, wherein said step of directing hot inlet gas into the chamber is performed while maintaining the chamber under superatmospheric pressure.

15. A method as claimed in claim 14, wherein the superatmospheric pressure is at least about 0.35 MPa absolute.

16. A method as claimed in claim 1, wherein the hot inlet gas contains predominantly inert gas.

17. A method as claimed in claim 1, wherein the hot inlet gas contains inert gas and roasting byproducts including water vapor, further comprising the step of maintaining the concentration of the roasting byproducts other than water vapor at a controlled, elevated concentration.

18. A method as claimed in claim 1, wherein the hot inlet gas contains water vapor, further comprising the step of maintaining the concentration of the water vapor in the hot inlet gas at a level to prevent hydrolysis of the beans.

19. A method as claimed in claim 1, further comprising the step of forming a closed gas circulation system including the chamber in which the exhaust gas is converted into the hot inlet gas.

20. A method as claimed in claim 1, further comprising the step of building up the pressure in the chamber until the chamber is at a desired pressure between 0.35 MPa and about 2.1 MPa and only thereafter charging the change of beans into the chamber.

21. A method as claimed in claim 1, further comprising the step of arranging the screen to extend across the top of the chamber.

22. A method as claimed in claim 1, further comprising the steps of:
mounting the shutter to a rotatable shaft such that the shutter is rotatable over the screen to block different sectors of the screen; and
rotating the shaft to cause the shutter to bock the gas flow through the different sectors of the screen.

23. A method as claimed in claim 22, further comprising the step of connecting the shutter to the shaft by a pin joint.

24. A method as claimed in claim 1, wherein the chamber is defined in only a portion of a vessel, said step of directing the hot inlet gas into the chamber comprises the step of directing the hot inlet gas through an aperture formed in a side of the vessel.

25. A method as claimed in claim 1, wherein the chamber is defined in only a portion of a vessel, said step of discharging the exhaust gas from the chamber comprises the step of discharging the exhaust gas through an aperture formed in a side of the vessel.

26. A method as claimed in claim 1, wherein the chamber is defined in only a portion of a vessel, said step of charging the charge of beans into the chamber comprises the step of directing the beans into the chamber through an aperture formed in a side of the vessel.

27. A method as claimed in claim 1, wherein said step of discharging an exhaust gas from the chamber comprises the step of discharging the exhaust gas from a location above the screen.

28. A method as claimed in claim 1, wherein said step of directing a hot inlet gas into the chamber comprises the step of directing the hot inlet gas into the chamber such that the hot inlet gas flows through the chamber from adjacent the bottom of the chamber to adjacent the top of the chamber.

29. A method as claimed in claim 1, further comprising the steps of:
reheating only a portion of the exhaust gas;
combining the reheated portion of the exhaust gas with a remaining, unheated portion of the exhaust gas;
passing the combined reheated portion of the exhaust gas and unheated portion of the exhaust gas back to the chamber in the inlet gas; and
regulating the portion of exhaust gas being reheated to thereby obtain a desired temperature of the beans in the chamber.

30. A method for roasting beans comprising:
charging a charge of beans into a roasting chamber having a top and bottom;
directing a hot inlet gas into the chamber to supply heat to the beans and cause the beans to be roasted whereby the gas flows toward the top of the chamber;
discharging an exhaust gas including roasting byproducts from the chamber;
reheating the exhaust gas;
passing the reheated exhaust gas to the chamber as part of the hot inlet gas, said reheating step and said step of directing hot inlet gas into the chamber being performed by passing a charge of gas through a substantially closed gas circulation system including the chamber so that the charge of gas is substantially retained within the circulation system; and
discharging the charge of beans from the chamber, reloading the chamber with a new charge of beans while substantially retaining the charge of gas within the circulation system, and repeating cyclically so as to roast a series of charges of beans while substantially retaining the charge of gas within the circulation system.

31. A method as claimed in claim 30, wherein said step of reheating the exhaust gas comprises the step of passing the exhaust gas through a heater that generates heat and transfers it to the exhaust gas to thereby reheat the exhaust gas.

32. A method as claimed in claim 31, wherein the circulation system includes a closeable branch containing a cooler, the method further comprising the step of cooling each charge of beans within the chamber prior to discharging that charge of beans from the chamber by circulating a portion of the charge of gas through the closeable branch of the circulation system containing the cooler and the chamber without circulating such portion of the charge of gas through the heater.

33. A method as claimed in claim 30, further comprising the step of venting a selected portion of the charge of gas.

34. A method as claimed in claim 33, wherein said step of venting a selected portion of the charge of gas is performed so as to vent little or no gas during roasting of one or more early charges until the gas within the circulation system attains a desired level of volatile bean products and then vent more gas during roasting of one or more later charges so as to maintain the level of volatile bean products within the gas substantially constant.

35. A method as claimed in claim 30, wherein said step of directing hot inlet gas through the chamber is performed while maintaining the chamber under a first superatmospheric pressure, the method further comprising the steps of reducing the pressure within the chamber to a pressure below the first superatmospheric pressure by transferring gas from the circulation system into a pressure release tank prior to discharging each charge of beans from the chamber and subsequently reintroducing gas captured in the pressure release tank into the circulation system.

36. A method as claimed in claim 35, wherein said reintroducing step includes the steps of pumping gas from the pressure release tank into a pressure storage tank and holding the gas in the pressure storage tank at a pressure above the pressure prevailing in the circulation system, and directing gas from the pressure storage tank into the circulation system.

37. A method as claimed in claim 30, further comprising the step of building up the pressure in the chamber until the chamber is at a desired pressure between 0.35 MPa and about 2.1 MPa and only thereafter charging the change of beans into the chamber.

38. A method as claimed in claim 30, further comprising the step of trapping beans which are carried upward in the chamber by a screen arranged proximate the top of the chamber.

39. A method as claimed in claim 38, wherein the chamber is defined in only a portion of a vessel, said step of charging the charge of beans into the chamber comprises the step of directing the beans into the chamber through an aperture formed in a side of the vessel.

40. A method as claimed in claim 38, wherein said step of discharging an exhaust gas from the chamber comprises the step of discharging the exhaust gas from a location above the screen.

41. A method as claimed in claim 38, further comprising the steps of:

arranging a movable shutter above the screen capable of blocking gas flow through the screen; and moving the shutter to selectively block gas flow through different portions of the screen such that beans held in engagement with the screen by the flowing gas are released from engagement with the screen at that portion of the screen at which the shutter is blocking the gas flow and fall downward to the bottom of the chamber.

42. A method as claimed in claim 41, further comprising the steps of:

mounting the shutter to a rotatable shaft such that the shutter is rotatable over the screen to block different sectors of the screen; and rotating the shaft to cause the shutter to bock the gas flow through the different sectors of the screen.

43. A method as claimed in claim 30, wherein the chamber is defined in only a portion of a vessel, said step of directing the hot inlet gas into the chamber comprises the step of directing the hot inlet gas through an aperture formed in a side of the vessel.

44. A method as claimed in claim 30, wherein the chamber is defined in only a portion of a vessel, said step of discharging the exhaust gas from the chamber comprises the step of discharging the exhaust gas through an aperture formed in a side of the vessel.

45. A method for roasting beans comprising:

arranging a top screen and a bottom screen inside a closed, pressurizeable vessel to define a roasting chamber in the vessel between the top and bottom screens;

pressurizing the vessel;

charging a charge of beans into the roasting chamber through an aperture in the vessel;

directing a hot inlet gas into the chamber through an aperture in the vessel to thereby supply heat to the beans and cause the beans to be roasted whereby the gas flows upward toward the top screen, the beans which are carried upward in the chamber being trapped by the top screen;

discharging an exhaust gas including roasting byproducts from the vessel through an aperture in the vessel;

discharging the roasted beans from the chamber through a transfer valve formed in connection with the vessel.

* * * * *